US008817019B2

(12) United States Patent
Naidu et al.

(10) Patent No.: US 8,817,019 B2
(45) Date of Patent: Aug. 26, 2014

(54) TWO-DIMENSIONAL COLORED PROJECTION IMAGE FROM THREE-DIMENSIONAL IMAGE DATA

(75) Inventors: Ram Naidu, Newton, MA (US); Sergey Simanovsky, Brookline, MA (US); Andrew Litvin, Wakefield, MA (US)

(73) Assignee: Analogic Corporation, Peabody, MA (US)

( * ) Notice: Subject to any disclaimer, the term of this patent is extended or adjusted under 35 U.S.C. 154(b) by 184 days.

(21) Appl. No.: 13/387,851

(22) PCT Filed: Jul. 31, 2009

(86) PCT No.: PCT/US2009/052454
§ 371 (c)(1),
(2), (4) Date: Jan. 30, 2012

(87) PCT Pub. No.: WO2011/014192
PCT Pub. Date: Feb. 3, 2011

(65) Prior Publication Data
US 2012/0127174 A1    May 24, 2012

(51) Int. Cl.
G06T 15/00    (2011.01)
G09G 5/02    (2006.01)

(52) U.S. Cl.
USPC .......................................... 345/419; 345/589

(58) Field of Classification Search
USPC ....................................................... 345/419
See application file for complete search history.

(56) References Cited

U.S. PATENT DOCUMENTS

2006/0274066 A1*  12/2006  Ying et al. ..................... 345/424
2008/0095462 A1*  4/2008  Hsieh et al. .................... 382/275

FOREIGN PATENT DOCUMENTS

WO    2006099477 A1    9/2006
WO    2009017931 A2    2/2009

OTHER PUBLICATIONS

Abidi, B., et al. "Screener Evaluation of Pseudo-Colored Single Energy X-ray Luggage Images." Computer Vision and Pattern Recognition-Workshops, 2005. CVPR Workshops. IEEE Computer Society Conference on. IEEE, 2005.*
International Search Report cited in related application No. PCT/US2009/052454 dated May 10, 2010.
Abidi B et al: "Screener Evaluation of Pseudo-Colored Single Energy X-ray Luggage Images", Computer Vision and Pattern Recognition, 2005 IEEE Computer Society Conference on, IEEE, Piscataway, NJ, USA, Jun. 25, 2005, p. 35, XP031259673, ISBN: 978-0-7695-2372-9.
Kannan Kase: "Effective Use of Color in X-ray Image Enhancement for Luggage Inspection", Internet Citation Jul. 1, 2002, p. 38PP, XP007912715, Retrieved from the Internet: URL:http://imaging.utk.edu/publications/papers/dissertation/kase_project.pdf>.

* cited by examiner

Primary Examiner — Kee M Tung
Assistant Examiner — Vu Nguyen
(74) Attorney, Agent, or Firm — Cooper Legal Group LLC

(57) ABSTRACT

A projection image of an object is colored using three-dimensional image data. This may be particularly useful in radiographic imaging applications, for example. In one embodiment, a colored synthetic image is rendered from a colored three-dimensional image of an object, and color components of pixels of the synthetic image are used to determine color components, or color values, for corresponding pixels of a projection image depicting a similar view of the object as the synthetic image. In this way, the two-dimensional projection image is colored similarly to the colored three-dimensional image. For example, the projection image may be colored based upon density (if the three-dimensional image is colored based upon density) so aspects of the object that attenuate a similar amount of radiation but have different densities may be colored differently.

20 Claims, 4 Drawing Sheets

TWO-DIMENSIONAL COLORED PROJECTION IMAGE FROM THREE-DIMENSIONAL IMAGE DATA

BACKGROUND

The present application relates to the field of radiographic imaging. It finds particular application with computed tomography (CT) scanners. It also relates to medical, security, and other applications where generating a colored two-dimensional projection image from three-dimensional image data would be useful.

CT and other radiographic imaging systems are useful to provide information, or images, of interior aspects of an object under examination. Generally, the object is exposed to radiation, and a two-dimensional image and/or a three-dimensional image is formed based upon the radiation absorbed by the interior aspects of the object, or rather an amount of radiation that is able to pass through the object. Typically, highly dense aspects of the object absorb more radiation than less dense aspects, and thus an aspect having a higher density, such as a bone or mass, for example, will be apparent when surrounded by less dense aspects, such as fat tissue or muscle.

In three-dimensional imaging scanners, such as CT scanners, for example, three-dimensional colored images may be produced from data that is acquired from a radiological examination of an object. Generally, the colors are representative of a property of the object, or rather a property of interior aspects of the object, such as density and/or atomic number. For example, inside a suitcase under examination, a metal plate (e.g., with a density of 11340 kg/m$^3$) may be colored red while a plastic box (e.g., with a density of 1000 kg/m$^3$) may be colored yellow. A colored three-dimensional image may be projected onto an arbitrary observation plane through a technique commonly referred to as "rendering." The resulting colored image can be displayed on the computer screen. In an airport security environment, for example, coloring the image may assist security personnel in identifying objects that may be a threat (e.g. guns, knives, explosives, etc.).

Three-dimensional image scanners may also display two-dimensional projection images of an object under examination. In some scanners, these two-dimensional images can be formed directly from the acquired data, without forming a 3D image. Because three-dimensional images take longer to generate and may be more time consuming for human personnel to review, in some applications (e.g., high throughput luggage examinations) it may be more beneficial for personnel to initially review a two-dimensional projection image. If the personnel believes a closer examination is warranted (e.g., a potential security threat exist in a piece of luggage), the personnel may consult a three-dimensional image of the object for a more detailed review of the object.

While two-dimensional projection images have a high resolution and low artifacts (e.g., in comparison to two-dimensional synthetic images produced by rendering three-dimensional images, that typically comprise more artifacts and/or are more grainy), a disadvantage of two-dimensional projection images generated from three-dimensional image scanners is that they are often formed as grayscale images (e.g., the images lack color) because the image pixels carry information on a total attenuation value along a particular direction, and not on specific density values encountered along said direction. Thus, the interior aspects of the object will appear in varying shades of gray depending upon the aspects' attenuations.

In some three-dimensional scanners, two-dimensional projection images may be colored similarly to projection images produced by two-dimensional scanners (e.g., line scanners). That is, the two-dimensional projection image may be colored based upon the attenuation of radiation that traversed the object under examination (e.g., a shade of gray on the projection image is replaced with a color indicative of the shade of gray it is replacing). For example, a first portion of the object attenuating fifty percent of the radiation that traversed the first portion may be colored blue on the projection image, and a second portion of the object, attenuating twenty percent of the radiation that traversed the second portion may be colored yellow on the projection image. While such coloring has proven useful, the coloring does not reliably depict the composition of aspects of the object under examination. For example, a stack of books may be colored the same color as a metal plate because both a stack of books and a metal plate may attenuate a similar amount of radiation. As can be appreciated, this can inhibit an ability to accurately examine one or more scanned objects.

SUMMARY

As provided herein a two-dimensional projection image can be colored similarly to a corresponding three-dimensional image. This can enhance on-screen visualization (e.g., to more easily identify threats) by allowing, for example, personnel to switch between the two-dimensional projection image and the three-dimensional image, and readily identify corresponding aspects of the two images. Additionally, the coloring may depict properties of the object, or aspects of the object, other than attenuation, such as density and/or atomic number for example. Thus, a metal plate may be colored differently than a stack of books, for example, so that such items can be readily differentiated from one another.

Aspects of the present application address the above matters, and others. According to one aspect, a method for use with radiographic imaging is provided. The method comprises using three-dimensional image data of an object to generate a colored two-dimensional projection image of the object.

According to another aspect, an apparatus is provided. The apparatus comprises a color generator configured to receive a two-dimensional projection image and a colored two-dimensional synthetic image that was rendered from three-dimensional image data. The color generator is also configured to color a first pixel of the projection image using color components of a first pixel of the colored synthetic image.

According to yet another aspect, a method is provided. The method comprises generating a colored three-dimensional image of an object under examination and rendering a colored two-dimensional synthetic image of the object from the colored three-dimensional image. The method also comprises generating a two-dimensional projection image of the object, wherein the projection image is in correspondence with the colored synthetic image. The method further comprises extracting red-green-blue (RGB) components from a first pixel of the colored synthetic image and converting the RGB components to hue-saturation-value (HSV) components. The method also comprises computing at least one HSV component for a first pixel of the projection image using one or more HSV components for the first pixel of the colored synthetic image.

FIGURES

The application is illustrated by way of example and not limitation in the figures of the accompanying drawings, in which like references indicate similar elements and in which.

DESCRIPTION

Figure 1:
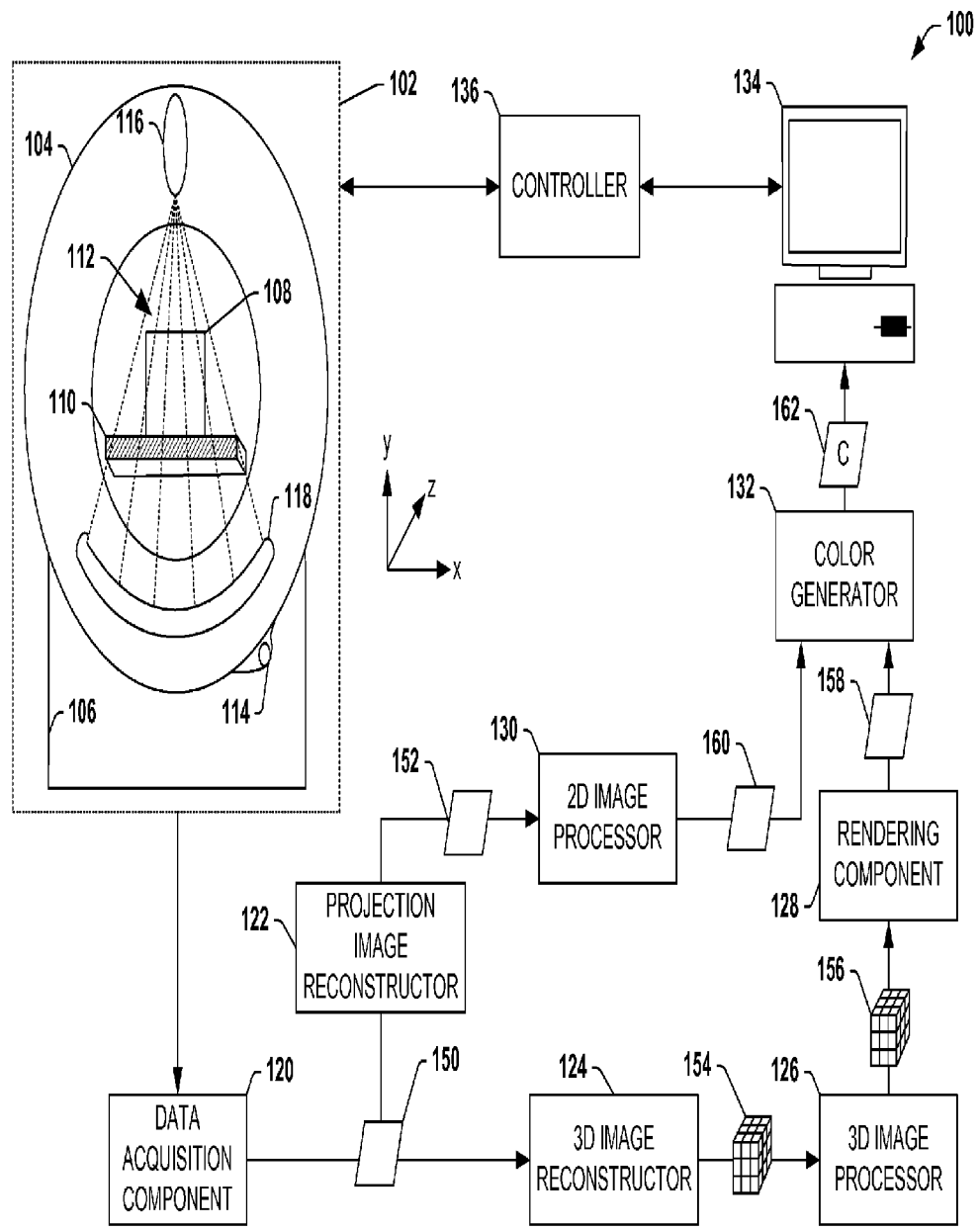
FIG. 1 is a schematic block diagram illustrating an example environment for using three-dimensional image data to generate a colored two-dimensional projection image.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Systems and techniques for coloring a two-dimensional projection image using three-dimensional image data produced from an imaging apparatus (e.g., a computed tomography (CT) image of a piece of luggage under examination at a security station at an airport) are provided herein. That is, in one embodiment, one or more techniques and/or systems for using three-dimensional image data of an object to generate a colored two-dimensional projection image of the object are provided.

FIG. 1 is an illustration of an example three-dimensional imaging scanner 100 which may be employed for identifying potential threat containing objects (e.g., a gun) from a class of objects (e.g., contents of a suitcase), for identifying a tumor in a region of the body and/or for other radiographic imaging applications, for example. One type of three-dimensional imaging scanner commonly used in the art is referred to as a computed tomography (CT) scanner.

In the example, the scanner 100 comprises an object scanning apparatus 102. The object scanning apparatus 102 comprises a rotating gantry portion 104 and a stationary gantry portion 106. During an examination of an object 108, the object 108 is placed on a surface 110, such as a bed or conveyor belt, selectively positioned in an examination region 112 (e.g., a hallow bore in the rotating gantry 104), and the rotating gantry portion 104 is rotated by a rotator 114 relative to the stationary gantry portion 106.

The bore-like rotating gantry 104 generally surrounds the examination region 112 and comprises a radiation source 116 (e.g., an ionizing x-ray source) and a detector array 118 (e.g., a multi-channel detector array) mounted on a substantially diametrically opposite side of the rotating gantry 104 relative to the radiation source 116. During an examination of the object 108, the radiation source 116 (which may be rotating along with the rotating gantry 104) emits fan, cone, wedge, and/or other shaped radiation onto the object 108. Radiation that traverses the object 108 is detected by the detector array 118 (which is also rotating along with the rotating gantry 104).

As an example, a computer tomography (CT) security scanner 100 that includes an x-ray source 116, such as an x-ray tube, can generate a fan, cone, wedge, or other shaped beam of x-ray radiation that traverses one or more objects 108, such as suitcases, in an examination region 112. In this example, the x-rays that are emitted by the source 116 traverse the examination region 112 that contains the object(s) 108 to be scanned and are detected by an x-ray detector array 118 across from the x-ray source 116. Further, a rotator 114, such as a gantry motor drive attached to a rotating gantry portion 104 of the scanner 100, can be used to rotate the x-ray source 116 and detector array 118 around the object(s) 108, for example. In this way, x-ray projections from a variety of perspectives of the suitcase can be collected, for example, creating a set of x-ray projections for the object(s) 108.

It will be appreciated that in other embodiments, a three-dimensional scanner may be configured differently from the three-dimensional scanner 100 herein described. For example, in another embodiment, the rotating gantry 104 is stationary and the object 108 is rotated inside the examination region 112.

In the example scanner 100, a data acquisition component 120 is operably coupled to the object scanning apparatus 102, and is typically configured to collect information and data from the detector array 118, and may be used to compile the collected data into projection space data 150 for an object 108 under examination. As an example, x-ray projections may be acquired at each of a plurality of angular positions of the x-ray source with respect to the object(s) 108. Further, as the object(s) 108 is conveyed from an upstream portion of the object scanning apparatus 102 to a downstream portion (e.g., conveying objects parallel to the rotational axis of the scanning array (into and out of the page)), the plurality of x-ray projections may be acquired at a plurality of points along the axis of rotation with respect to the object(s) 108. In the illustrated example, the plurality of angular positions of the x-ray source may comprise a circle in the plane containing x and y axis with respect to the object(s) 108 being scanned, while the rotational axis may comprise a z axis with respect to the object(s) 108 being scanned.

In the example scanner 100, a projection image reconstructor 122 is configured to receive the projection space data 150 and generate one or more two-dimensional projection images 152 indicative of the object 108 under examination using interpolation, filtering and other signal processing techniques known to those skilled in the art. For example, a first projection image may depict the object 108 (e.g., a suitcase), or rather internal aspects of the object 108, as viewed from a first angular position of the radiation source 116 (e.g., a top-down view of the suitcase is generated). Similarly, a second projection image may depict the object 108 as viewed from a second angular position of the radiation source 116 (e.g., a side-view of the suitcase). In this way, a plurality of images depicting the object 108 from a plurality of views may be created.

Typically, the projection image(s) 152 is shaded in shades of gray (e.g., creating a grayscale image) as a function of the attenuation of radiation passing through a geometric region of the object 108 represented by a pixel of the two-dimensional image 152. For example, a pixel that represents a first portion of the object that attenuated fifty percent of the radiation that traversed the first portion may be assigned a shade value corresponding to a darker shade of gray than a pixel that represents a second portion of the object that attenuated ten percent of the radiation that traversed the second portion.

It will be appreciated that because the shade determination is a function of the attenuation of radiation, aspects of the object 108 that have different compositions but attenuate approximately the same amount of radiation may be shaded the same shade of gray. For example, a pixel that represents a stack of books may be assigned a shade value corresponding to the same shade of gray as a pixel that represents a metal plate. Stated differently, when the radiation source 116 is directly above the object 108 (e.g., as illustrated), a set of books that are stacked in the y-dimension may attenuate approximately the same amount of radiation as a metal plate with a thinner y-dimension because the projection image reconstructor 122 may not distinguish where along the y-dimension the radiation was attenuated.

It will be appreciated that in some prior art scanners (e.g., line scanners and some CT scanners), the projection image(s) 152 produced from the projection image reconstructor 122 may be colored based upon a value of the gray shade assigned to the respective pixel. For example, pixels with a low shade value (e.g., shades 1-10) may be assigned a color value corresponding to yellow and pixels with a higher shade value (e.g., shades 40-50) may be assigned a color value corresponding to red. While this may help personnel more quickly identify areas of potential concern (relative to grayscale images), the coloring is far from conclusive because a gun or a stack of books may both be colored the same color (e.g., because pixels indicative of the gun and pixels indicative of the stack of books may have been assigned a similar color).

The example scanner 100 also comprises a three-dimensional (3D) image reconstructor 124 that is configured to receive projection space data 150 from the data acquisition component 120 and to generate three-dimensional image data 154 (e.g. used to derive a three-dimensional image) using suitable analytical, iterative, or other three-dimensional image reconstruction techniques known to those skilled in the art (e.g., tomosynthesis reconstruction, etc.). Generally, generating the three-dimensional image data 154 involves combining projection space data 150 from multiple positions of the x-ray source to create a three-dimensional representation of the object 108. The three-dimensional representation of the object 108, viewed from an arbitrary angle, can be presented in human perceptible form on a monitor of a terminal, wherein human personnel may be provided the ability to select a view angle. In this way, human personnel is provided with the ability to view inner aspects of the object 108 from multiple angles.

It will be appreciated that by generating the three-dimensional image data 154, properties of aspects of the object 108 that were not able to be identified from the projection image(s) 152 may be identified. For example, the density and/or atomic number of aspects of the object 108 may be identified. Thus, respective voxels of the three-dimensional image data 154 may be labeled with a density and/or atomic number, for example, indicative of the density and/or atomic number for the portion of the object 108 that is represented by the voxel.

The example scanner 100 further comprises a three-dimensional image processor 126 configured to receive the three-dimensional image data 154 and generate enhanced and/or colored three-dimensional image data 156. In one embodiment, the colored three-dimensional image data 156 is generated by assigning color values to voxels of the three-dimensional image data 154 based upon a property (e.g., density, atomic number, etc.) of the object 108 that is represented by the respective voxels. For example, a first voxel, representing a first aspect of the object 108 (e.g., with a density of 1000 kg/m$^3$) may be assigned a color value corresponding to yellow, and a second voxel, representing a second aspect of the object 108 (e.g., with a density of 11000 kg/m$^3$) may be assigned a color value corresponding to red.

Unlike a colored two-dimensional projection image, which may be colored based upon the amount of radiation attenuated along in a given region (e.g., a region extending from the top of the object 108 in the y-dimension to the bottom of the object 108 if the image depicts a top-down view), the three-dimensional image data 154 may be colored according to properties that are indicative of the composition (e.g., the material) of the object 108. For example, a stack of books may be colored differently than a thinner metal plate (e.g., because the stack of books has a lower density than the thinner metal plate). Thus, an image that is colored based upon the composition of the object 108, or rather the composition of various aspects of the object 108, may promote the accurate identification of aspects of the object 108 that are of interest by human personnel, for example, as compared to an image that is colored based upon the attenuation of radiation traversing the object 108.

In one embodiment, the three-dimensional image processor 126 is also configured to enhance the three-dimensional image data 154 using enhancement techniques known to those skilled in the art. For example, the three-dimensional image processor 126 may be configured to sharpen the image data 154 and/or enhance edges (e.g., causing the edges of aspects within the image of the object 108 to stand out) using a space-variant image dependent three-dimensional high-pass filter, for example. In this way, outlines of an aspect of the object (e.g., a gun in a suitcase) may be better discerned in the three-dimensional image data 154 (relative to an image without the enhancement).

The example scanner 100 also comprises a rendering component 128 configured to receive the colored three-dimensional image data 156, and to render colored two-dimensional synthetic image data 158 from the colored three-dimensional image data 156 using rendering techniques known to those skilled in the art. The two-dimensional synthetic image(s) 158 depicts a desired view of the object 108 (e.g., a top-down view of the object 108 under examination). In one example, rendering comprises summing up voxel densities along a line perpendicular to the desired view. For example, if the desired view extends in an x, z plane, voxels extending along a line in the y-dimension may be summed up and the summed values may be associated with a pixel representing the voxels (e.g., a pixel of the two-dimensional synthetic image data 158 may represent the summed up densities of voxels having similar x and z dimensions as the pixel). It will be appreciated that the term "desired image" is used herein in a broad sense to describe an image that depicts a view of the object from a predetermined angular position. The predetermined angular position may be held constant for a plurality of views (e.g., the desired image remains a top-down view) and/or it may be a function of the object being scanned (e.g., the desired image is an image that depicts the greatest surface area of the object).

The example scanner 100 further comprises a two-dimensional image processor 130 that is configured to receive one or more two-dimensional projection images 152 from the projection image reconstructor 122. In one example, the two-dimensional projection image(s) 152 received by the two-dimensional image processor 130 is a projection image of the desired view (e.g., projection images depicting undesired views are not sent from the projection image reconstructor 122 to the two-dimensional image processor 130). In another example, all of the projection images acquired from an examination of the object under examination are transmitted to the two-dimensional image processor 130, and the two-dimension image processor 130 may be configured to select the projection image(s) of the desired view.

The two-dimensional image processor 130 may also be configured to enhance the received two-dimensional projection image(s) 152. In one embodiment, the two-dimensional image processor 130 may be configured to sharpen the image(s) (e.g., enhancing the edges) using sharpening techniques known to those skilled in the art. For example, the projection image(s) may be sharpened using a space-variant image dependent two-dimensional high-pass filter. In this way, the visibility of the edges of an object, or an aspect of the object, may be enhanced while reducing computation time (relative to other sharpening techniques). In another embodiment, the two-dimensional image processor 130 may be configured to enhance the contrast of the two-dimensional projection image(s) 152 by generating a histogram of the two-dimensional projection image that is intended to be enhanced and modifying the values of pixels in the image so that a histogram of the modified image matches a desired histogram. In this way, different aspects of the object (e.g., values assigned to pixels depicting different aspects of object in the grayscale two-dimensional projection image) are better distinguished (e.g., making it easier to distinguish between a first aspect of the object, having a first range of pixel values, and a second aspect of the object, having a second, different, range of pixel values).

In the example scanner 100, an enhanced two-dimensional projection image(s) 160 that is generated from enhancing the two-dimensional projection image 152 by the two-dimensional image processor 130 and the colored two-dimensional synthetic image 158 are transmitted to a color generator 132 configured to receive both projection image(s) and colored synthetic image(s). In one embodiment, where both undesired and desired projection images and/or synthetic images are transmitted to the color generator 132, the color generator may be configured to select the desired projection and/or synthetic images. Undesired images may be discarded by the color generator 132.

Once the color generator 132 has received a two-dimensional projection image 160 and a colored two-dimensional synthetic image 158, the color generator 132 may be configured to color the two-dimensional projection image 160 based upon the colors of the colored two-dimensional synthetic image 158. That is, that color generator 132 may use the two-dimension synthetic image 158 to color a corresponding two-dimensional projection image 160 that depicts that same or similar view (e.g., a desired view) of the object under examination. In this way, a colored two-dimensional projection image 162 of an object under examination is produced using three-dimensional image data (that has been rendered to generate a two-dimensional synthetic image 158) and one or more two-dimensional projection images 160.

The colored two-dimensional projection image 162 may be presented in human perceptible form on a monitor of a terminal 134 (e.g., a computer) for human observation. In one embodiment, the terminal is also configured to receive human input. The received input may be transmitted to a controller 136 configured to generate instructions for the object scanning apparatus 102. For example, a package inspector viewing the colored two-dimensional projection image 162 may want to view a different section of the object and/or view the object from a different view and may thus instruct the surface 110 to move the object. It will be appreciated that other image data may also be transmitted to the terminal 134. For example, the colored three-dimensional image data 156 may be transmitted to the terminal, and a human inspector may select to view the colored two-dimensional projection image 162 and/or the colored three-dimensional image data 156, for example.

Figure 2:
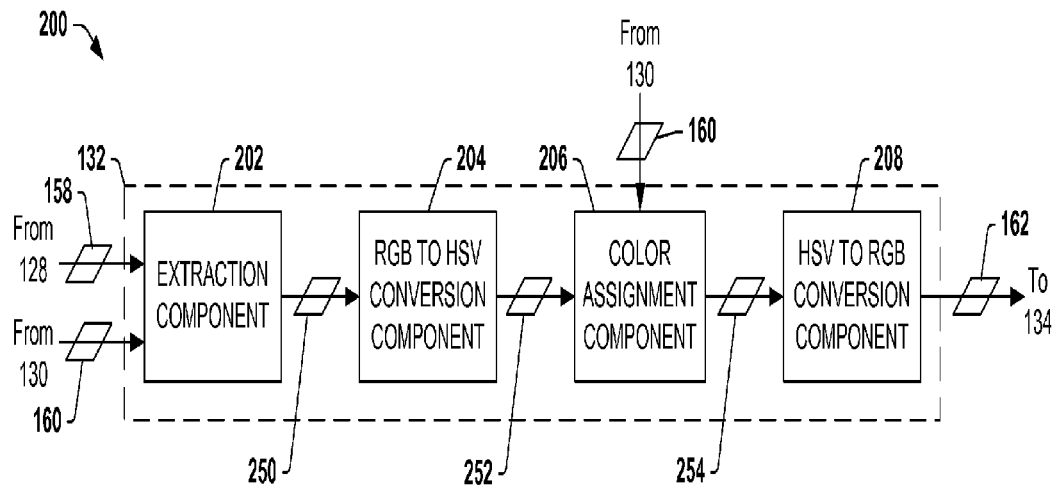
FIG. 2 illustrates an example color generator.

FIG. 2 is a component block diagram of one example embodiment 200 of a color generator 132, which can be configured to generate one or more colored two-dimensional projection images 162 of an object (e.g., 108 in FIG. 1) from colored three-dimensional image data (e.g., 156 in FIG. 1) and two-dimensional projection image(s) 160.

The example embodiment 200 of the color generator 132 comprises an extraction component 202 configured to extract color components (e.g., RGB components) from the colored two-dimensional synthetic image 158 that was rendered from the colored three-dimensional image data (e.g., by the rendering component 128 in FIG. 1). The extraction component 202 can also be configured to extract color components (e.g., RGB components) from a pixel of the grayscale projection image 160 (e.g., which may illustrate the absence of color (e.g. RGB color components are equal)). In one embodiment, to orderly track the extracted RGB components, the RGB components for respective pixels of the synthetic image 158 are assigned a label indicative of a corresponding pixel of the two-dimensional projection image 160 (e.g., a pixel of the synthetic image 158 and corresponding pixel of the projection image 160 are representative of substantially the same portion of the object). In this way, the extracted color components may be identified with the pixel of the projection image 160 that will (eventually) be colored using the extracted color components.

The color generator 132 also comprises a red-green-blue (RGB) to hue-saturation-value (HSV) conversion component 204 that is configured to receive the extracted RGB components 250 from the extraction component 202 and convert the RGB components to HSV components using trigonometric and/or other conversion techniques known to those skilled in the art. In this way, the color components are converted from rectangular coordinates in RGB space to polar coordinates in HSV space. It will be appreciated that by converting from RGB components to HSV components, color is separated from intensity. Therefore, various aspects of the color (e.g., the hue, saturation, and/or value) can be adjusted individually.

The color generator 132 also comprises a color assignment component 206 configured to receive the HSV components 252 of a pixel of the colored two-dimensional synthetic image 158 from the RGB to HSV conversion component 204. Using the HSV components, the color assignment component 206 is configured to compute color components (e.g., hue-saturation-value components) for the corresponding pixel of the projection image 160. Stated differently, the color assignment component 206 assigns HSV components to a first pixel of projection image 160 based upon HSV components of a first pixel of the colored synthetic image 158, wherein the first pixel of the colored synthetic image 158 and the first pixel of the projection image 160 depict similar portions of the object (e.g., the first pixel of the projection image 160 and the first pixel of the colored synthetic image 158 represent substantially the same path of x-ray radiation through the object under examination).

It will be appreciated that numerous ways of computing the HSV components of the projection image 160 are contemplated and that some or all of the HSV components of a pixel of the projection image 160 may be computed using the HSV components of a corresponding pixel of the colored synthetic image 158. In one example, the hue component and saturation component of the pixel of the projection image 160 are set equal to the hue component and saturation component, respectively, of the corresponding pixel of the synthetic image 158, and the value component of the pixel of the projection image 160 is computed as a function of an intensity value of the pixel of the projection image 160 (e.g., where intensity is computed based upon the attenuation of radiation that traverses the portion of the object represented by the pixel being colored).

In another example, the hue and value components are computed similarly to the acts described above, but the saturation component for the pixel of the projection image 160 is a function of both the saturation component of the corresponding pixel of the colored synthetic image 158 and the intensity of the pixel of the projection image 160. For example, the saturation component of the pixel of the projection image 160 may be determined by modifying the saturation component of the corresponding pixel of the synthetic image 158 as a non-linear function of the intensity of the pixel of the projection image 160. In this way, the transmission of undesirable artifacts (that appear in the three-dimensional image data 156) may be reduced or suppressed when the color is assigned to the pixel of the two-dimensional projection image 160.

The example embodiment 200 of the color generator 132 also comprises an HSV to RGB conversion component 208 configured to convert the (recently assigned) HSV components 254 of the pixel of the projection image 160 into RGB components using trigonometric and/or other conversion techniques known to those skilled in the art. Generally HSV components 254 cannot be displayed on a display, so converting the HSV components 254 to RGB components allows the colors to be displayed on a monitor of a terminal 134, for example.

The components of the color generator may repeat the acts described herein to assign color values (in the form of RGB components) to a plurality of pixels of the two-dimensional projection image 160. In this way, the color generator causes the two-dimensional projection image 160 to become a colored two-dimensional projection image 162. The colored two-dimensional projection image 162 may be output from the color generator 132 and displayed on a monitor of a terminal (e.g., 134 in FIG. 1), for example.

It will be appreciated that because the two-dimensional projection image 160 is colored from a synthetic image 158 that is rendered from colored three-dimensional image data, the coloring is similar to the coloring of the three-dimensional image data. Therefore, the coloring may be indicative of characteristics of the object other than attenuation such as density and/or atomic number, for example. Further, because the coloring is similar to the coloring of three-dimensional image data, human personnel, for example, may switch between the colored two-dimensional projection image 162 and the colored three-dimensional image data and (easily) identify similar aspects of the object in the projection image 162 and the three-dimensional image data 156. That is, aspects in the colored three-dimensional image data 156 will be colored similarly to the same aspect in the colored two-dimensional projection image 162, making it potentially easier to identify the aspect when switching back and forth between the two images, for example.

Figure 3:
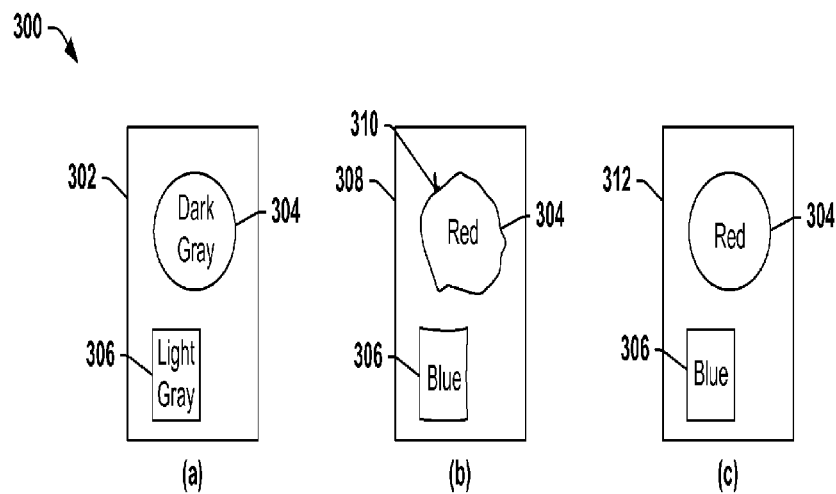
FIG. 3 illustrates an example projection image, colored synthetic image rendered from a colored three-dimensional image, and a colored projection image.

FIG. 3 illustrates a plurality of two-dimensional images 300 of an object (e.g., 108 in FIG. 1) under examination. Such images may be produced by the example scanner 100 in FIG. 1, for example, or another scanner configured to produce three-dimensional image data (e.g., 154 in FIG. 1) indicative of an object under examination.

FIG. 3(a) represents a grayscale two-dimensional projection image 302 (e.g., 160 in FIG. 1) of an object under examination at a first view. The image 302 depicts an oval aspect 304 and a square aspect 306 of the object under examination. In the illustrated example, the aspects are shaded according to the attenuation of radiation that traversed the aspect. For example, the square aspect 306 is shaded a lighter shade of gray than the oval aspect 304 (which is shaded dark gray) because the square aspect 306 attenuates less radiation than the oval aspect 304. It will be appreciated that in another embodiment, the oval aspect and the square aspect are colored based upon the attenuation of radiation that traversed the aspect. That is, the gray shading is simply replaced by a color that corresponds (e.g., in a look-up table) to the shade value assigned to the pixels representing the various aspects. For example, the oval aspect 304 may be colored red and the square aspect 306 may be colored yellow.

FIG. 3(b) represents a colored two-dimensional synthetic image 308 (e.g., 158 in FIG. 1) that is rendered from colored three-dimensional image data (e.g., 156 in FIG. 1) of the object under examination at the first view (e.g., the synthetic image 308 is coincident to the projection image 302). While the illustrated synthetic image 308 and the projection image 302 depict the same view, it will be appreciated that there are some notable differences between the two images. For example, the oval aspect 304 and the square aspect 306 of the synthetic image 308 are colored red and blue, respectively. These colors are based upon colored three-dimensional image data (e.g., 156 in FIG. 1) that was used to render the two-dimensional synthetic image 308. Because the synthetic image 308 is derived from three-dimensional image data, the coloring may be based upon the composition of the aspect (e.g., the density and/or atomic number of the aspect) instead of the attenuation, for example. Thus, the colors of the synthetic image 308 may represent the actual contents of the object under examination better than the projection image 302 that is shaded based upon the attenuation of radiation that traversed the object (or a projection image that is colored based upon the attenuation of radiation that traversed the object).

A second distinction between the projection image 302 and the synthetic image 308 is the image quality of the respective images. For example, the edges of aspects depicted in the synthetic image 308 are not well defined (e.g., the edges are wavy and/or blurry). Further, additional artifacts 310 are depicted in the synthetic image 308 that are not depicted in the projection image. It will be appreciated that for these reasons (amongst others) it may be less useful (or less ideal) to display a synthetic image than it is to display a projection image. Thus, it would be beneficial to create a projection image that is colored similarly to the two-dimensional synthetic image 308.

FIG. 3(c) represents a colored two-dimensional projection image 312 depicting the same view as the view depicted in the projection image 302 and the synthetic view 308. The colored two-dimensional projection image 312 is derived (at least partially from) three-dimensional image data of the object under examination. Stated differently, the colored two-dimensional projection image 312 is derived by coloring the two-dimensional projection image 302 based upon the colored synthetic image 308 (e.g., rendered from colored three-dimensional image data 156). As illustrated, the oval aspect 304 is colored red and the square aspect 306 is colored blue (e.g., similar to the coloring in the synthetic image 308), but the aspects 304 and 306 have a resolution similar to the projection image 302 (e.g., the additional artifact 310 is absent and the edges of the aspects are not blurry).

The colored projection image 312 has numerous benefits over the projection image 302 and/or the synthetic image 308. For example, the image is a projection image so it generally has a higher resolution and fewer artifacts than a synthetic image depicting the same view. Additionally, because the image is colored based upon three-dimensional image data, additional data that is generally not used to color projection images, such as density and atomic number, may be used to color the image. Thus the resulting colored projection image 312 may depict the composition of aspects of the object under examination better than a projection image that is colored based upon the attenuation of radiation, for example.

A method may be devised for coloring two-dimensional projection data (e.g., 160 in FIG. 1) using three-dimensional image data (e.g., 154 in FIG. 1). In one embodiment, the method may be used at a security checkpoint scanner that screens passenger luggage for potential threat items. In this embodiment, the ability to detect potential threats may be improved if security personnel could monitor colored two-dimensional images of an object and, when a potential threat is identified, switch to a three-dimensional image of the object that depicts the object in a similar manner (e.g., similar colors) as the two-dimensional image. Such a procedure (e.g., switching back and forth between images) may be quicker and less intrusive than physically inspecting each piece of luggage that is identified as containing a potential threat.

Figure 4:
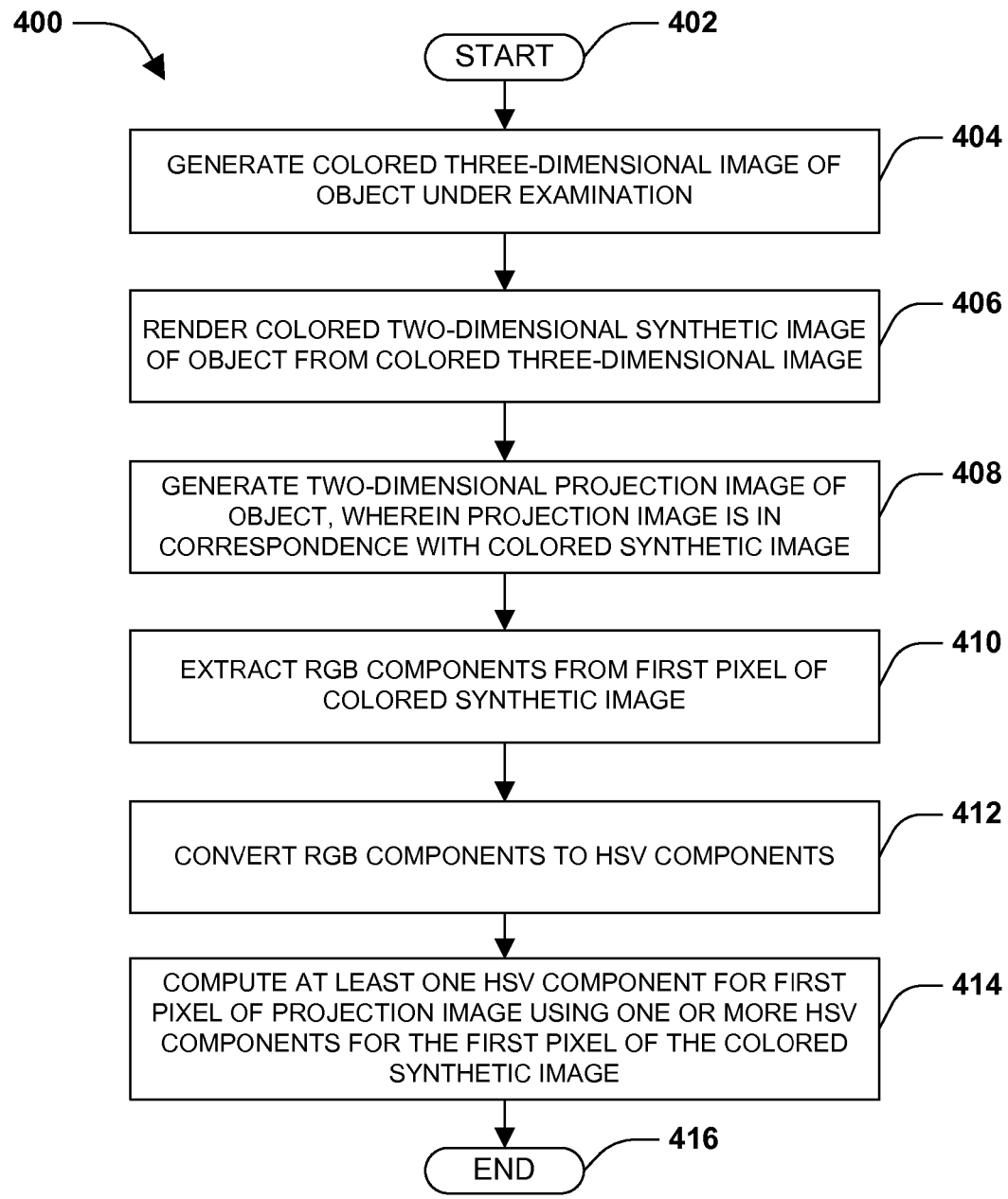
FIG. 4 is a flow diagram illustrating an example method for coloring a two-dimensional projection image using three-dimensional image data.

FIG. 4 is a flow chart diagram of an example method 400. Such an example method 400 may be useful for generating a colored two-dimensional projection image of an object under examination using three-dimensional image data, for example. The method begins at 402 and involves generating a colored three-dimensional image of the object under examination at 404.

Generally, the colored three-dimensional image is generated by performing a radiological examination of an object using a three-dimensional scanner (e.g., a CT scanner) that is configured to capture data from a plurality of views of the object. Such data may be used to create a plurality of projection images (where a first projection image is indicative of data related to a first view of an object, a second projection image is indicative of data related to a second view, etc.) and/or one or more three-dimensional images of the object using techniques known to those skilled in the art for converting data from projection space to image space (e.g., backprojection, tomosynthesis, etc.).

Voxels of the three-dimensional image are colored based upon a characteristic of the voxel (e.g., the density of the portion of the object represented by the voxel, the atomic number of the portion of the object represented by the voxel, etc.) in accordance with a predefined look-up table to generate the colored three-dimensional image of the object. For example, in a look-up table, voxels with a density value in the range of one hundred to two hundred kilograms per cubic meter may be assigned a color value indicative of yellow (e.g., the voxel will appear yellow when displayed on a monitor), and voxels with a density value in the range of ten thousand to eleven thousand kilograms per cubic meter may be assigned a color value indicative of red. In this way, respective voxels of the three-dimensional image data may be colored to generate colored three-dimensional image data, where colors are indicative of the composition of the object, or rather the composition of aspects of the object.

In one embodiment the three-dimensional image and/or the colored three-dimensional image may be sharpened to improve the resolution of the image and/or enhance portions of the image, such as edges of one or more aspects of the object that are depicted in the image. For example, to enhance the visibility of edges of one or more aspects of the object, a space-variant image dependent three-dimensional high-pass filter may be applied to the three-dimensional image and/or the colored three-dimensional image. In this way image voxels that have a characteristic of the voxel (e.g., the density, the atomic number, etc.) with one or more predetermined ranges may be sharpened while other voxels that have values outside the predetermined ranges are not sharpened (e.g., reducing the computation time relative to sharpening each voxel), for example. It will be appreciated that other sharpening techniques not discussed herein but known to those skilled in the art are also contemplated for improving the resolution and/or quality of the three-dimensional image and/or the colored three-dimensional image.

At 406, a colored two-dimensional synthetic image of the object under examination is rendered from the colored three-dimensional image. Rendering techniques are commonly known to those skilled in the art and generally comprise flattening the three-dimensional image to make it a two-dimensional synthetic image. For example, in one embodiment, rendering comprises summing up values of the voxels situated along a line perpendicular to a desired two-dimensional image plane (e.g., summing up voxels in the y-dimension when the two-dimensional image coincides with an xz-plane) and assigning the summed value to a pixel of the two-dimensional synthetic image representing the summation line. It will be appreciated that because the colored synthetic image is rendered from a colored three-dimensional image, pixels of the synthetic image may be assigned color values similar to the color values of voxels along the summation line represented by the pixel. Thus, the colors may be indicative of the composition (e.g., density, atomic number, etc.) of aspects of the object (rather than colors indicative of the attenuation of radiation which may or may not be based upon the composition of aspects of the object).

At 408, a two-dimensional projection image of the object is generated so that said projection image is in correspondence with the colored synthetic image. That is, the projection image and the colored synthetic image depict a similar, or rather the same, view of the object. For example, if the synthetic image depicts a top down view of the object (e.g., a view of the object that would be seen if a person were positioned at a point perpendicular to an examination surface on which the object resides and were looking down onto the object), the projection image may also depict a top down view of the object. Moreover, respective pairs of pixels of the two images (e.g. where a pair is defined as a first pixel (e.g., pixel 1) of the projection image and a corresponding first pixel (e.g., pixel 1) of the colored synthetic image) represent substantially the same portion of the object under examination. In this way, a first aspect of the synthetic image may have coincidence with a first aspect of the projection image, a second aspect of the synthetic image may have coincidence with a second aspect of the projection image, etc.

It will be appreciated that like the three-dimensional image and/or the colored three-dimensional image, the synthetic image and/or the projection image may be sharpened to improve the resolution of image(s) and/or to enhance a portion of the image (e.g., enhance edges of aspects depicted in the image(s)). For example, to enhance the visibility of edges of one or more aspects of the object, a space-variant image dependent two-dimensional high-pass filter may be applied to the synthetic image and/or the projection. In this way pixels that have a characteristic of the voxel (e.g. attenuation) within one or more predetermined ranges may be sharpened while other pixels that have values outside the predetermined range(s) is not sharpened (e.g., reducing the computation time relative to sharpening each pixel), for example. It will be appreciated that other sharpening techniques not discussed herein but known to those skilled in the art are also contemplated for improving the resolution and/or quality of the synthetic image and/or the projection image.

The color components (e.g., red-green-blue components) of the colored synthetic image may be used to color, or to determine color components, of the projection image. Stated differently, a first pixel of the projection image may be colored, or color components of the first pixel may be determined, based upon one or more color components of a first pixel of the colored synthetic image, wherein the first pixel of the colored synthetic image and the first pixel of the projection image are in correspondence (e.g., the first pixel of the colored synthetic image and the first pixel of the projection image depict substantially the same portion of the object under examination). By coloring the projection image using at least one color component of the colored synthetic image, a colored two-dimensional projection image that is colored based upon the composition of aspects of the object (e.g., rather than attenuation of radiation which may or may not be indicative of a composition of the aspects) may be generated. The acts described below are one embodiment for how to use the colored synthetic image (rendered from three-dimensional image data) to color a projection image and, thus, generate a colored-two-dimension projection image.

At 410, red-green-blue (RGB) components are extracted from a first pixel of the colored synthetic image using RGB extraction techniques known to those skilled in the art. These RGB components may be tagged with an identification label indicative of the first pixel of the colored synthetic image and/or an identification label indicative of a first pixel of the projection image, wherein the first pixel of the projection image and the first pixel of the colored synthetic image are in correspondence (depict substantially the same portion of the object under examination). In this way, the color components of the first pixel of the synthetic image may later be associated with the first pixel of the projection image to color the first pixel.

At 412 the RGB components that were extracted from the first pixel of the colored synthetic image are converted to hue-saturation-value (HSV) components using trigonometric techniques and/or other RGB to HSV conversion techniques known to those skilled in the art. In HSV space the intensity and color characteristics of the pixel are separated. Thus, it may be useful to perform such conversions when it is beneficial to alter a color component without altering a brightness component, for example.

At 414, at least one HSV component for a first pixel of the projection image is computed, or determined, using one or more HSV components for the first pixel of the colored synthetic image. Generally, the first pixel of the projection image corresponds to the first pixel of colored synthetic image. In this way where the three-dimensional image coloring was based on the density of aspects of the object, for example, the colors are still representative of density of the aspects when depicted on the colored projection image (e.g., a pixel of the synthetic image that depicts a first aspect of the object and a pixel of the projection image that depicts the same first aspect are both colored red).

In one embodiment, the HSV components for a first pixel of the projection image are computed, or determined, as follows. A hue component for the first pixel of the projection image is set equal to the hue component for the first pixel of the colored synthetic image, a saturation component for the first pixel of the projection image is set equal to the saturation component for the first pixel of the colored synthetic image, and a value component for the first pixel of the projection image is computed as a function of an intensity value of the first pixel of the projection image. It will be appreciated that in other embodiments, the HSV components may be computed in other ways known to those skilled in the art. For example, in another embodiment, the hue and value components are computed in a manner similar to the manner describe above, but the saturation component is determined by modifying the saturation component for the first pixel of the colored synthetic image as a non-linear function of the intensity value of the first pixel of the projection image. In this way, artifacts that appear in the first pixel of the synthetic image may not appear (or the artifact may not be as prominent) in the coloring of the projection image.

To display the colored two-dimensional image on a monitor of a terminal, for example, the HSV components of the colored projection image may be converted to RGB components using trigonometric techniques or other HSV to RGB conversion techniques known to those skilled in the art. In this way, the color components are converted from polar coordinates to rectangular coordinates that are more suitable for image displays.

The method ends at 416.

Figure 5:
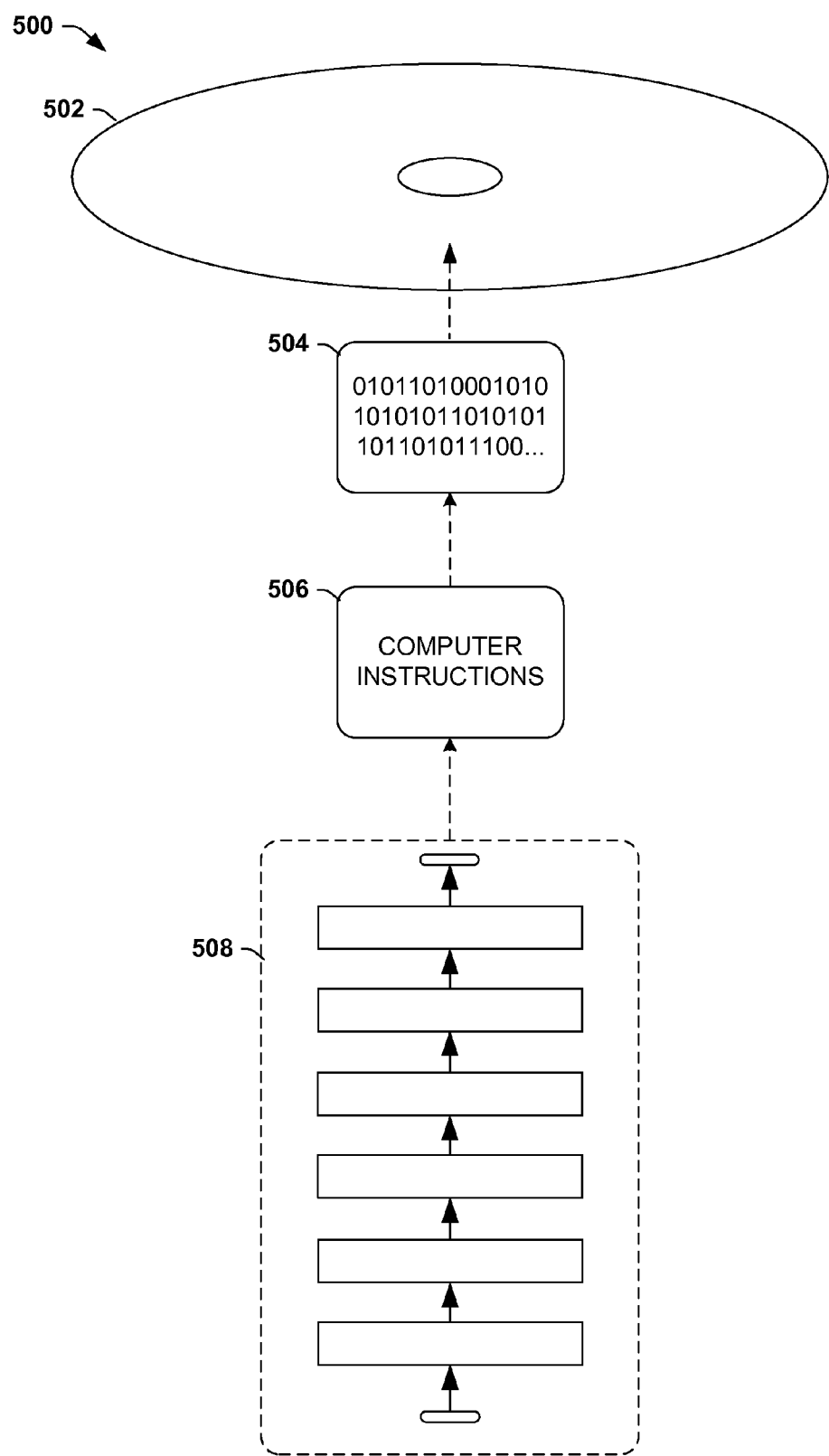
FIG. 5 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to one or more of the principles set forth herein. In one such embodiment 500, the processor-executable instructions 506 may be configured to perform a method 508, such as the example method 400 of FIG. 4, for example. In another such embodiment, the processor-executable instructions 506 may be configured to implement a system, such as at least some of the exemplary scanner 100 of FIG. 1, for example. Many such computer-readable media may be devised by those of ordinary skill in the art that are configured to operate in accordance with one or more of the techniques presented herein.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. A method, comprising:
   performing an examination of an object via radiation to yield a two-dimensional projection image of the object and a three-dimensional image of the object, the two-dimensional projection image indicative of a degree of attenuation experienced by at least a portion of the radiation for a desired view of the object;
   rendering a colored two-dimensional synthetic image of the object from the three-dimensional image of the object, the colored two-dimensional synthetic image depicting the object from the desired view;
   and
   coloring the two-dimensional projection image based upon the colored two-dimensional synthetic image to generate a colored two-dimensional projection image of the object depicting the object from the desired view,
   at least some of the method implemented at least in part via a processor.

2. The method of claim 1, comprising coloring one or more voxels of the three-dimensional image based upon a composition of the object to generate a colored three-dimensional image.

3. The method of claim 2, the rendering comprising rendering the colored two-dimensional synthetic image from the colored three-dimensional image.

4. The method of claim 1, the coloring comprising coloring a first pixel of the two-dimensional projection image based upon one or more color components of a first pixel of the colored two-dimensional synthetic image to generate the colored two-dimensional projection image, wherein the first pixel of the colored two-dimensional synthetic image is in spatial correspondence with the first pixel of the two-dimensional projection image.

5. The method of claim 4, the coloring a first pixel of the two-dimensional projection image comprising:
   extracting red-green-blue (RGB) components for the first pixel of the colored two-dimensional synthetic image;
   converting the RGB components for the first pixel of the colored two-dimensional synthetic image to hue-saturation-value (HSV) components for the first pixel of the colored two-dimensional synthetic image; and
   determining at least one HSV component for the first pixel of the two-dimensional projection image as a function of the HSV components for the first pixel of the colored two-dimensional synthetic image.

6. The method of claim 5, comprising determining a value component of the at least one HSV component for the first pixel of the two-dimensional projection image as a function of an intensity of the first pixel of the two-dimensional projection image.

7. The method of claim 5, comprising determining a hue component of the at least one HSV component for the first pixel of the two-dimensional projection image as a function of a hue component of the HSV components for the first pixel of the colored two-dimensional synthetic image.

8. The method of claim 5, comprising determining a saturation component of the at least one HSV component for the first pixel of the two-dimensional projection image as a function of a saturation component of the HSV components for the first pixel of the colored two-dimensional synthetic image.

9. The method of claim 8, wherein the saturation component of the at least one HSV component for the first pixel of the two-dimensional projection image is a function of an intensity of the first pixel of the two-dimensional projection image.

10. The method of claim 1, comprising, before the coloring, sharpening at least one of the three-dimensional image, the colored two-dimensional synthetic image, or the two-dimensional projection image.

11. The method of claim 1, the performing an examination comprising performing a computed tomography (CT) examination of the object.

12. An apparatus, comprising:
    a color generator component configured to:
       receive a two-dimensional projection image of an object under examination and a colored two-dimensional synthetic image of the object under examination, the two-dimensional projection image indicative of a degree of attention experienced by radiation for a desired view of the object and the colored two-dimensional synthetic image rendered based upon a three-dimensional image of the object; and
       color a first pixel of the two-dimensional projection image using color components of a first pixel of the colored two-dimensional synthetic image to generate a colored two-dimensional projection image.

13. The apparatus of claim 12, the color generator component comprising:
    an extraction component configured to extract at least some color components from the first pixel of the colored two-dimensional synthetic image; and
    a color assignment component configured to assign one or more color components to the first pixel of the two-dimensional projection image as a function of the at least some color components extracted from the first pixel of the colored two-dimensional synthetic image.

14. The apparatus of claim 13, wherein:
    the at least some color components are red-green-blue (RGB) components, and
    the apparatus comprises a RGB to hue-saturation-value (HSV) conversion component configured to convert the RGB components to HSV components.

15. The apparatus of claim 13, the color assignment component configured to assign a saturation component of the one or more color components as a function of at least one of a saturation component of the at least some color components extracted from the first pixel of the colored two-dimensional synthetic image or an intensity component of the first pixel of the two-dimensional projection image.

16. The apparatus of claim 12, comprising a three-dimensional image processor component configured to color a first voxel of the three-dimensional image based upon a composition of a portion of the object represented by the first voxel to generate a colored three-dimensional image.

17. The apparatus of claim 16, comprising a rendering component configured to render the colored two-dimensional synthetic image from the colored three-dimensional image.

18. The apparatus of claim 12, wherein the color generator component is part of a three-dimensional imaging modality.

19. A method, comprising:
  generating a three-dimensional image of an object and a two-dimensional projection image of the object based upon an examination using radiation, the two-dimensional projection image indicative of a degree of attenuation experienced by at least a portion of the radiation for a desired view of the object;
  rendering a colored two-dimensional synthetic image of the object from the three-dimensional image, the colored two-dimensional synthetic image depicting the object from the desired view;
  extracting red-green-blue (RGB) components from a first pixel of the colored two-dimensional synthetic image;
  converting the RGB components to hue-saturation-value (HSV) components for the first pixel of the colored two-dimensional synthetic image; and
  computing at least one HSV component for a first pixel of the two-dimensional projection image using one or more of the HSV components for the first pixel of the colored two-dimensional synthetic image to generate a colored two-dimensional projection image,
  at least some of the method implemented at least in part via a processor.

20. The method of claim 19, the computing comprising:
  setting a hue component of the at least one HSV component for the first pixel of the two-dimensional projection image equal to a hue component of the HSV components for the first pixel of the colored two-dimensional synthetic image;
  determining a value component of the at least one HSV component for the first pixel of the two-dimensional projection image as a function of an intensity component of the first pixel of the two-dimensional projection image; and
  determining a saturation component of the at least one HSV component for the first pixel of the two-dimensional projection image as a function of a saturation component of the HSV components of the first pixel of the colored two-dimensional synthetic image.

* * * * *